United States Patent
Johnson et al.

(10) Patent No.: US 9,712,654 B2
(45) Date of Patent: *Jul. 18, 2017

(54) MICROPHONE LINE BASED DETECTION OF HEADSET PLUG REMOVAL

(71) Applicant: Apple Inc., Cupertino, CA (US)

(72) Inventors: Timothy Johnson, Cupertino, CA (US); Scott Mullins, Cupertino, CA (US); Hugo Fiennes, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/231,138

(22) Filed: Mar. 31, 2014

(65) Prior Publication Data

US 2014/0213327 A1 Jul. 31, 2014

Related U.S. Application Data

(63) Continuation of application No. 13/633,763, filed on Oct. 2, 2012, now Pat. No. 8,687,798, which is a continuation of application No. 12/428,415, filed on Apr. 22, 2009, now Pat. No. 8,280,038.

(51) Int. Cl.
| | |
|---|---|
| *H04R 25/00* | (2006.01) |
| *H04M 1/60* | (2006.01) |
| *H04R 1/10* | (2006.01) |
| *H04M 1/05* | (2006.01) |

(52) U.S. Cl.
CPC ........ *H04M 1/6058* (2013.01); *H04R 1/1041* (2013.01); *H04M 1/05* (2013.01)

(58) Field of Classification Search
CPC . H04M 1/6058; H04R 1/1041; H04R 1/1033; H04R 3/007; H04R 3/02; H04R 5/033; H03G 3/348
USPC .... 379/430; 455/556.1, 575.1, 575.2, 569.1; 381/71.6, 74
See application file for complete search history.

(56) References Cited

U.S. PATENT DOCUMENTS

| | | | |
|---|---|---|---|
| 7,450,726 B2 | 11/2008 | Goyal | |
| 8,280,038 B2 * | 10/2012 | Johnson | H04R 1/1041 379/430 |

(Continued)

*Primary Examiner* — Davetta W Goins
*Assistant Examiner* — Phylesha Dabney
(74) *Attorney, Agent, or Firm* — Kilpatrick Townsend & Stockton LLP (57) ABSTRACT

Embodiments of the invention include methods, apparatus, systems and means for distinguishing between microphone line signals resulting from: actuation of a microphone button of a headset plugged into a telephone device jack, and removal of the headset plug form the jack. During a telephone call, a first signal can be detected on a microphone line of a headset jack to indicate whether a microphone button of the headset is actuated. Also, while the headset plug is being disconnected from the jack, a transition on the microphone line can be detected, from a second signal indicating that the microphone is being disconnected, to a third signal indicating that the microphone button is actuated. Consequently, to avoid erroneously hanging up a call, transitions to the third signal when removing the plug form the jack can be ignored and the call can be maintained. Other embodiments are also described and claimed.

32 Claims, 9 Drawing Sheets

(56) References Cited

U.S. PATENT DOCUMENTS

| | | | |
|---|---|---|---|
| 8,687,798 B2 * | 4/2014 | Johnson | H04M 1/6058 379/430 |
| 8,861,743 B2 * | 10/2014 | Pantfoerder | H04R 1/1041 307/125 |
| 2008/0175402 A1 | 7/2008 | Abe et al. | |
| 2009/0296952 A1 | 12/2009 | Pantfoerder et al. | |

\* cited by examiner

MICROPHONE LINE BASED DETECTION OF HEADSET PLUG REMOVAL

This application is a continuation of U.S. patent application Ser. No. 13/633,763, filed Oct. 2, 2012, and entitled "Microphone Line Based Detection of Headset Plug Removal," which is a continuation of U.S. patent application Ser. No. 12/428,415, filed Apr. 22, 2009, and entitled "Microphone Line Based Detection of Headset Plug Removal," both of which are incorporated by reference in their entirety as if fully disclosed herein.

FIELD

An embodiment of the invention relates to distinguishing between a signal transition indicating actuation of a microphone button of a headset plugged into a device jack, and a signal transition indicating removal of the headset plug from the jack.

BACKGROUND

Portable devices, such as mobile phones (e.g., cell phones), are becoming increasingly common. These portable devices have grown more complex over time, incorporating many features, including, for example, MP3 player capabilities, web browsing capabilities, capabilities of personal digital assistants (PDAs) and the like. Most of these devices include device jacks into which a headset or headphones may be plugged. In some cases, the headsets include, in addition to earphones for listening to output of the host device, a microphone to provide input to the host device over a microphone signal line. Such a headset may have a push button switch, (also referred to as a "microphone button") to send a DC control signal to the host device over the microphone signal line. For example, actuating the switch sends a signal that instructs the host device to disconnect or hang up an ongoing phone call.

SUMMARY

In some cases, a telephone call may be erroneously disconnected by the host device during removal of a headset plug from the jack, even when the user has not actuated the microphone button. This occurs because the host device incorrectly interprets a signal transition on the microphone line to be due to actuation of the microphone button, rather than due to removal of the plug. Such incorrect detection may occur when contacts of the plug cause a signal transition from a normal current level to a high current level on the microphone line contact of the jack, while removing the plug from the jack. This in turn may be due to the jack's ground contact connecting to the microphone line contact through a low impedance connection (e.g., through one or two speakers of a headset). Thus, removing the plug from the jack may result in the erroneous interpretation by causing two adjacent contacts of the plug to inadvertently connect the jack contacts through a substantially lower impedance path than a "normal" path on the microphone line (e.g., lower than a path detecting a normal audio signal at the microphone).

To avoid this situation, during a call, embodiments of the invention are able to distinguish between microphone line signal transitions resulting from: (1) actuation of the microphone button, and (2) removal of the headset plug from the jack. To do so, some embodiments of the host device can detect: (1) a transition between a first stable DC level at the microphone line and a third stable DC level (a transition indicating that the microphone button has been actuated); and (2) a transition from the first DC level to a second stable DC level and then a transition from the second to the third DC level, where the second level is not between the first and the third levels (either of these transitions indicating that the plug is being removed from the jack). By detecting and then ignoring the signal transitions in (2) above, the call is maintained, instead of being erroneously disconnected, during removal of the plug from the jack.

BRIEF DESCRIPTION OF THE DRAWINGS

The present embodiments are illustrated by way of example and not limitation in the figures of the accompanying drawings in which like references indicate similar elements.

DETAILED DESCRIPTION OF PREFERRED EMBODIMENTS OF THE INVENTION

Various embodiments and aspects of the inventions will be described with reference to details discussed below, and the accompanying drawings will illustrate the various embodiments. The following description and drawings are illustrative of embodiments of the invention and are not to be construed as limiting the invention. Numerous specific details are described to provide a thorough understanding of various embodiments of the invention. However, in certain instances, well-known or conventional details are not described in order to provide a concise discussion of embodiments of the inventions.

To provide a proper and efficient operation of mobile phones, plug detection mechanisms or circuitry may be used for determining whether a plug is present or has been removed from a jack of the phone. The device can be configured to adjust its operation responsive thereto. However, in some portable devices, the plug detection mechanism may detect when the plug has been removed after actual physical removal of the plug, or after erroneous interpretation or detection of a signal transition resulting from removal of a headset plug from the jack. Thus, in order for proper and more efficient device operation, an early plug removal detection circuit may be used to distinguish between a signal transition indicating actuation of a microphone button of a headset plugged in a device jack, and a signal transition received during removal of the headset plug from the jack.

Hence, the device can be configured to not adjust its operation responsive to the erroneous transition. For example, during a telephone call, a transition may be detected at a microphone line of the jack, indicating that a microphone button of a headset has been actuated; and a different signal transition may be detected, indicating that the plug is being removed from the jack. Thus, the phone call may be disconnected if the first transition is detected, but will be maintained if the different second transition is detected. Consequently, the device will not erroneously (unintentionally, or inadvertently) hang-up or disconnect a telephone call during removal of the plug from the jack. Also, in some embodiments, the device will not erroneously hang-up or disconnect a telephone call even though, during removal of the plug from the jack, the microphone contact and the ground contact of the jack inadvertently connect to each other through the substantially low impedance path of a headphone speaker (or both speakers). Although this path is not a direct short to ground, it is substantially lower in impedance than that of a headphone microphone. Herein, the terms "headset" and "headphone" may be used interchangeably.

Figure 1:
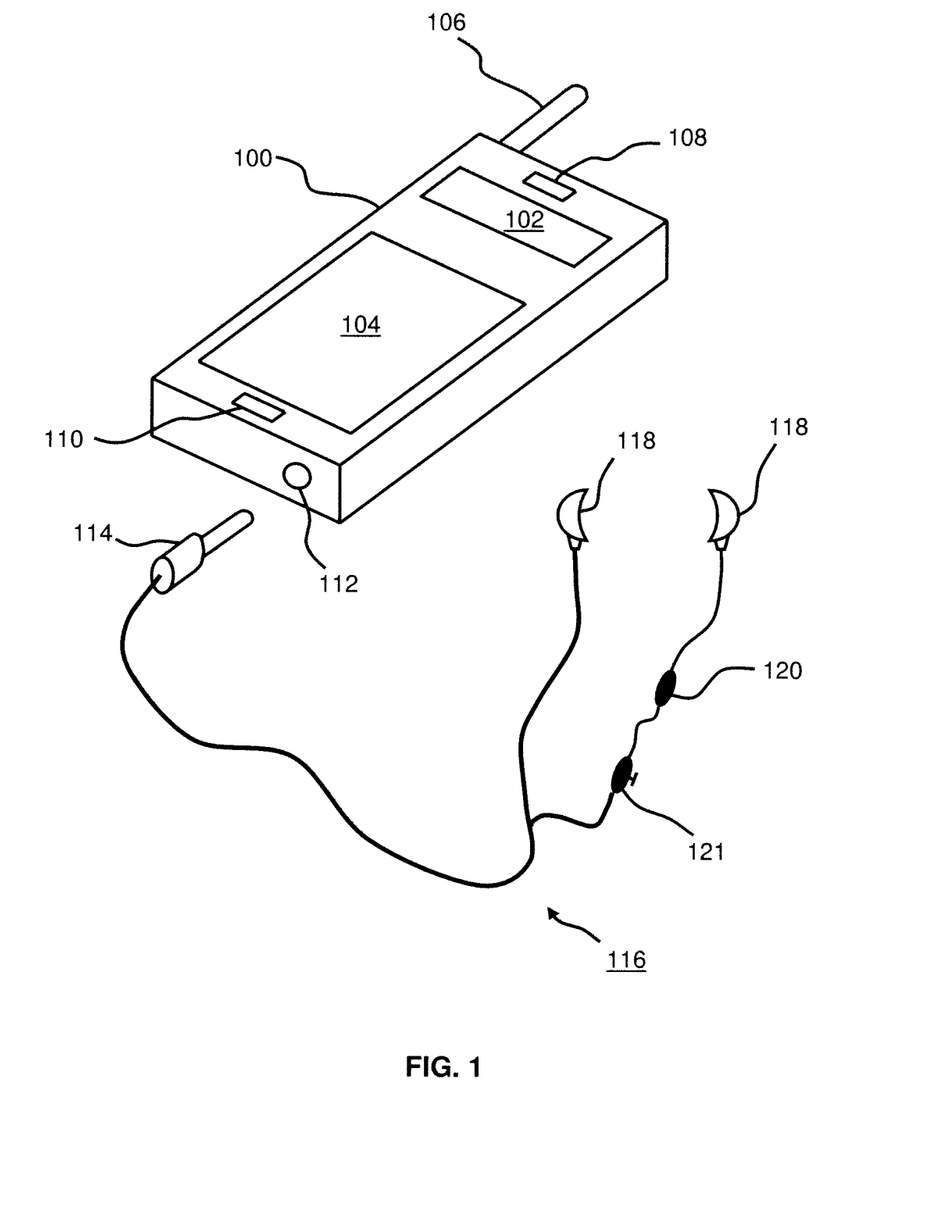
FIG. 1 shows an example of a mobile telephone which includes a headset jack, and a headset having a headset plug.

FIG. 1 illustrates mobile telephone 100 in accordance with some embodiments of the invention. Phone 100 can have display 102, user input interface 104, and external antenna 106. Display 102 can provide graphical information to a user. User input interface 104 can permit a user to input information into phone 100. For example, user input interface 104 can include one or more buttons, touchpads, touchscreens, scrollwheels, clickwheels, sliders, other appropriate input mechanism, or combinations thereof. In some embodiments of the invention, display 102 and user input interface 104 can be combined, e.g., in a touchscreen or touchsensitive display. In some embodiments, a combined display and user input interface may occupy at least 60 percent or at least 65 percent of one side or surface of phone 100.

Phone 100 also can be equipped with built-in speaker 108, built-in microphone 110, and headset jack 112. Built-in speaker 108 can output audible sound to a user, while built-in microphone 110 can accept audible sound from the user. Headset jack 112 can accept plug 114 from headset 116. When headset plug 114 is properly inserted into headset jack 112, phone 100 can be configured to output audible sound from earphones 118 rather than speaker 108; and to accept audible sound from headset microphone 120 rather than microphone 110. Thus, for some embodiments, phone 100 may be described as a host device, such as a host to headset 116.

Microphone button 121 of headset 116 can be used (e.g., actuated and/or released) to control the output of microphone 120 to phone 100, such as by controlling the signal received at jack 112 from the microphone. Button 121 can also be used to control the behavior of phone 100, such as by causing the phone to change between two behaviors or actions. Examples of behaviors controlled by button 121, include (but are not limited to) causing the phone to: (1) turn microphone 120 on and off, (2) cause music files stored in the phone (e.g., MP3 files or the like) to start playing, (3) disconnect a telephone call, and/or (4) initiate or dial a telephone call. Thus, when headset plug 114 is properly inserted into jack 112, actuating button 121 may cause phone 100 to disconnect an active telephone connection between phone 100 and another telephone capable device.

Button 121 may be a microphone button that as known in the art, such as a button that is actuated when a user presses or pushes the button. It may be a type of button that locks into an actuated position once pressed, and has to be pressed again to be released (un-actuated); or may be a type of button that does not lock but only maintains an actuated position while it is being pressed, and is released once the pressure is removed.

In some embodiments, phone 100 may represent any one or more of the various electronic devices having jack 112, as described herein. Similarly, headset 116 may represent one or more accessory components having plug 114, such as also described further below.

Figure 2:
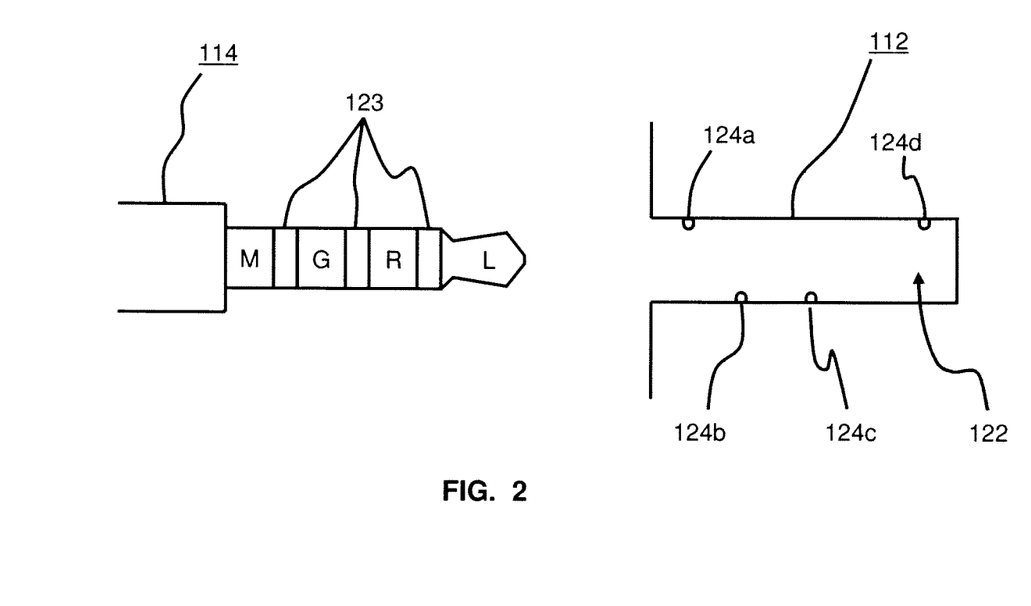
FIG. 2 shows an example of a headset jack and headset plug.

FIG. 2 illustrates headset jack 112 and headset plug 114 in greater detail in accordance with some embodiments of the invention. Headset jack 112 can have receptacle 122, within which is disposed one or more electrically conductive contacts 124a-124d. Headset plug 114 can have complementary electrically conductive contacts: microphone signal contact "M"; ground signal contact "G"; right earphone signal contact "R"; and left earphone signal contact "L". Each contact 124a-124d can be electrically isolated from adjacent contacts. Likewise, each contact M, G, R, and L also can be electrically isolated from adjacent contacts, such as by insulator rings 123 spaced along the length of plug 122. Insulator rings 123 may be or include one or more non-electrically conductive materials or insulator between contacts as know in the art. For example, insulator rings 123 may include a thickness of a dielectric material such as a non-conductive polymer, ceramic, plastic and/or rubber.

Figures 3, 4:
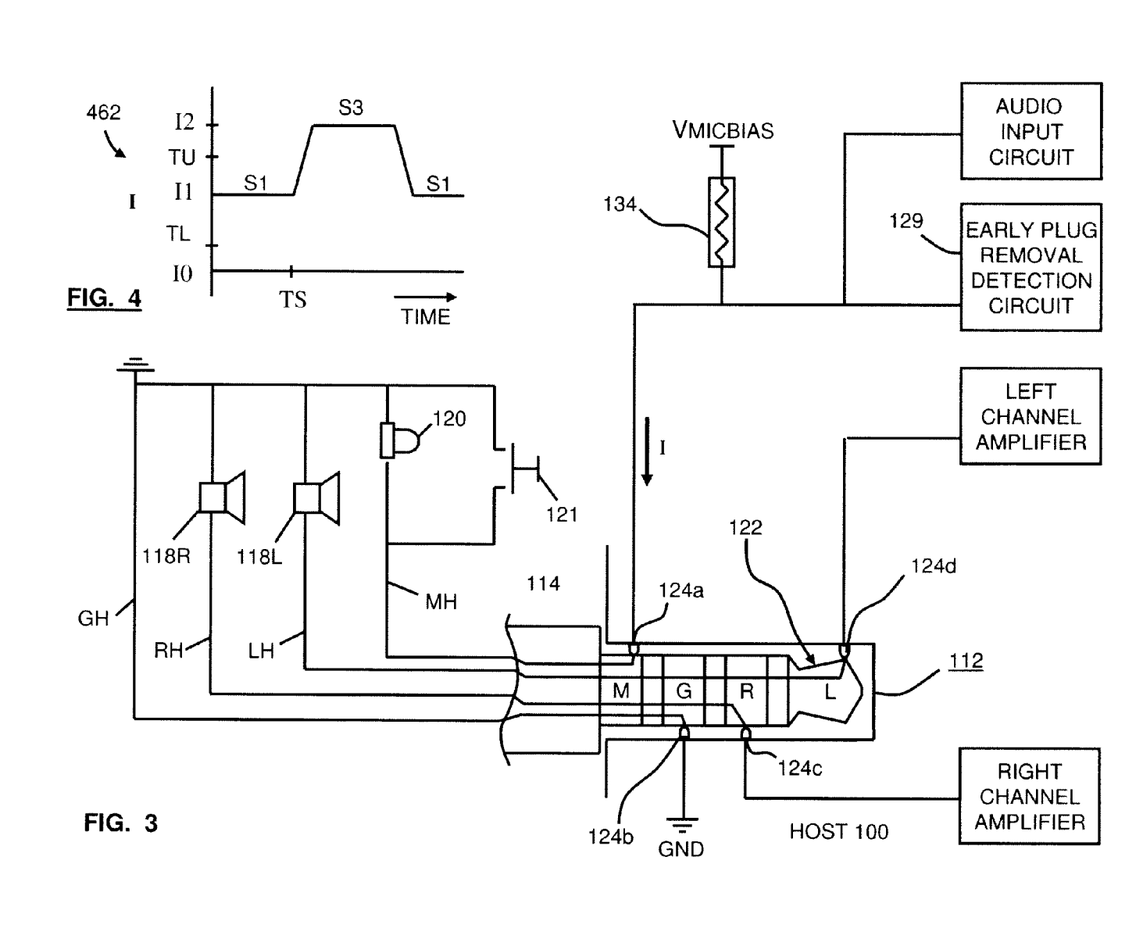
FIG. 3 shows an example of a headset jack, a headset plug, and electronic schematics of some embodiments of headset and mobile telephone circuitry.
FIG. 4 shows some embodiments of an example of a signal output by the microphone line when the microphone button is actuated.

FIG. 3 shows an example of a headset jack, a headset plug, and electronic schematics of some embodiments of headset and mobile phone circuitry. FIG. 3 shows plug 114 completely and properly inserted into receptacle 122 of jack 112 (e.g., not partially removed), such that contacts 124a-124d of host 100 make electrical contact with (e.g., touch) contacts M, G, R, and L of headset 116, respectively. Contacts 124a and M can transmit (e.g., pass) signals between phone 100 and microphone 120 (and button 121) of headset 116. Similarly, contacts 124b and G transmit a ground signal; and contacts 124c-d and R-L can transmit audio signals between phone 100 and earphones 118 of headset 116. FIG. 3 also shows contacts 124c and 124d electrically connected to right channel amplifier 154 and left channel amplifier 152 of host 100, respectively. These amplifiers may transmit or provide the audio signals to speakers 118R and 118L of headset 114, respectively. FIG. 3 also shows contact 124a electrically connected to bias voltage Vmicbias through resistor 134 of host 100. When the plug is completely inserted, contacts 124a and M connect or transmit signal or current "I", such as a signal controlled by Vmicbias, resistor 134, contact 124a, microphone 120 and switch 121. Contact 124a is electrically connected to audio input circuit and to early plug removal detection circuit 129. Although not shown in FIG. 3, each of these circuits may detect or measure current I, such as based on a voltage drop across resistor 134, and/or using other circuitry. Thus, the audio input circuit measures the audio signal of the microphone that comes in via this connection. Each contact 124a-d also can be assigned to serve other roles, such as for various types of headsets. For example, contact 124d and G can serve as ground and the remaining contacts can transmit signals, as described above.

FIG. 3 shows microphone 120 and button 121 electronically coupled in parallel between ground GND and contact M. Button 121 be a switch electronically coupled across the input and output of microphone 120. Ground GND may be coupled to ground contact G of the headset plug. Button 121 may be a switch that is normally in the open circuit position, but when actuated creates a short circuit across the input and output of microphone 120, shorting contact M to ground GND. Microphone 120 may use a field effect transistor or amplification system to amplify a sensed signal in the audio range, such as from a human voice.

Figure 5A:
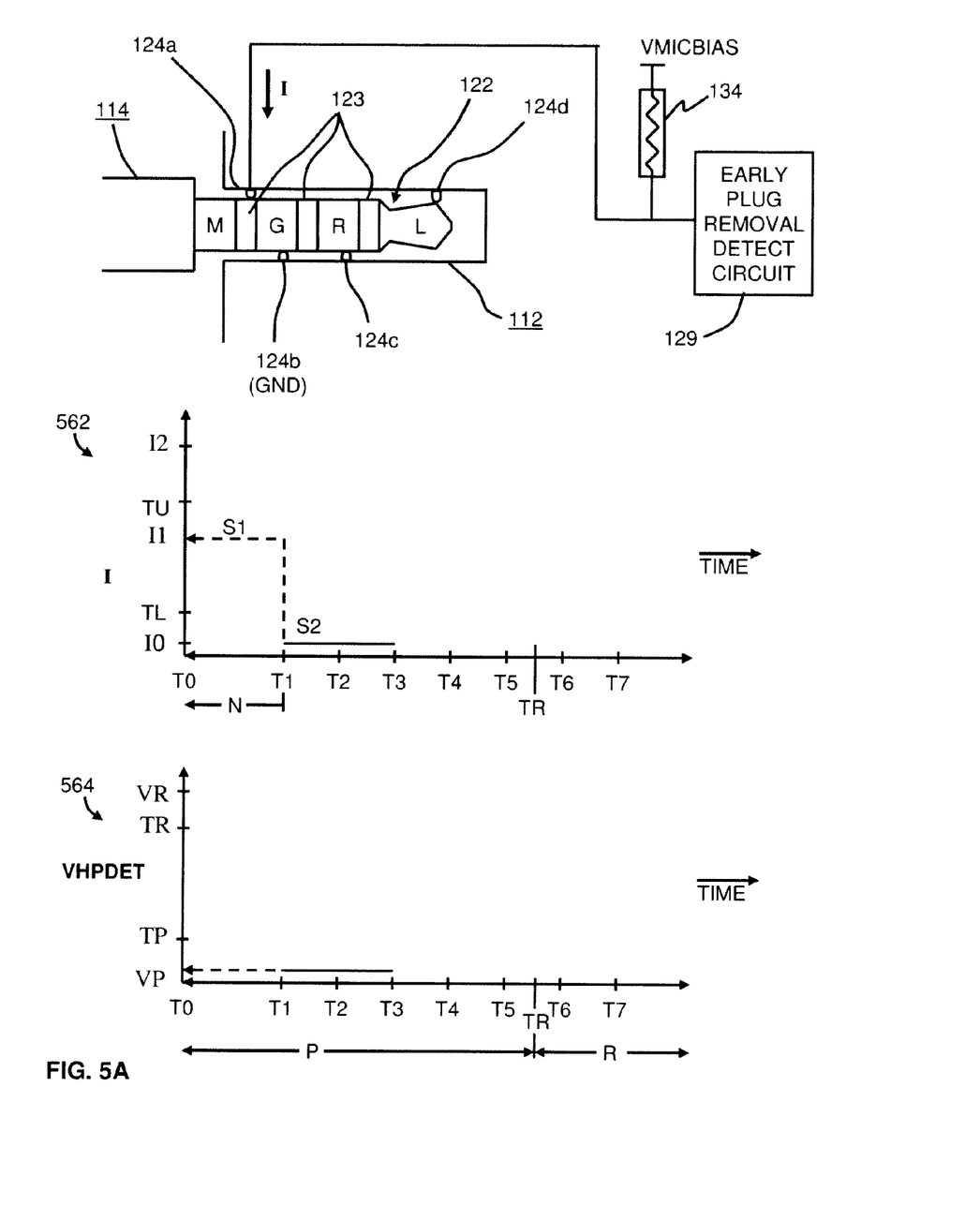
FIG. 5A-5C show examples of contact between plug contacts and jack contacts, and examples of microphone line signals and headphone detect signals when the plug is being removed from the socket.
Figure 5B:
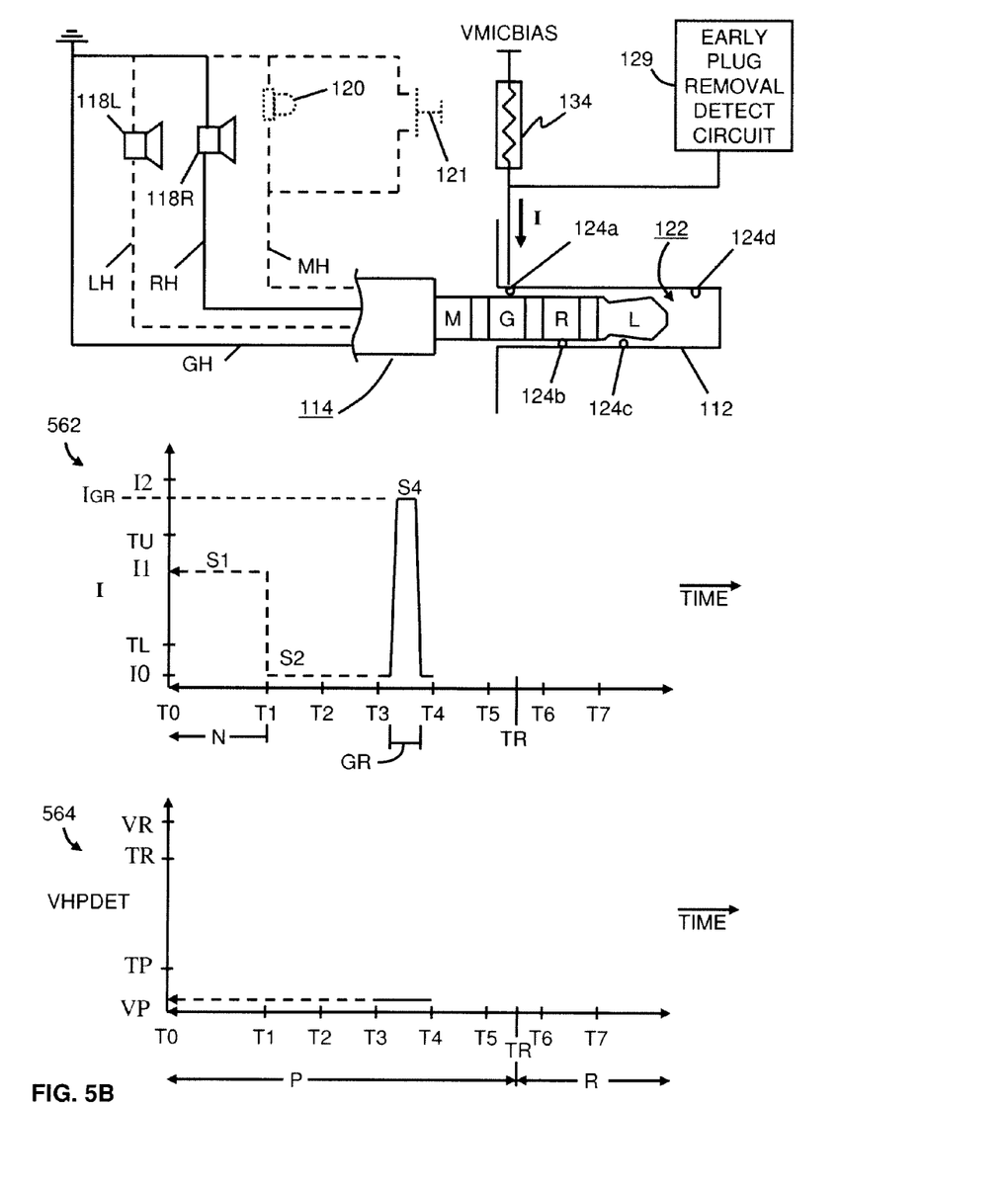
Figure 5C:
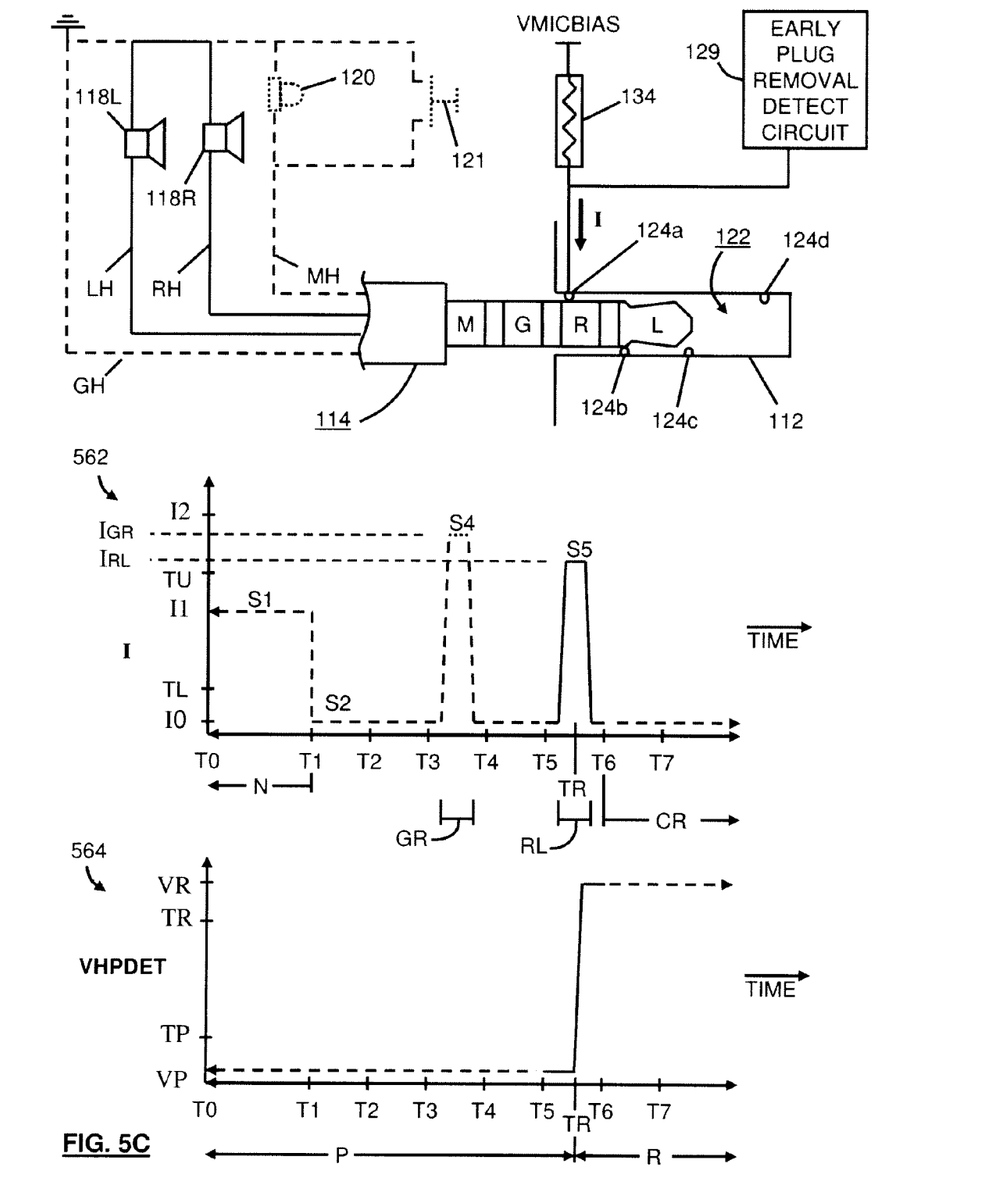
Figure 6:
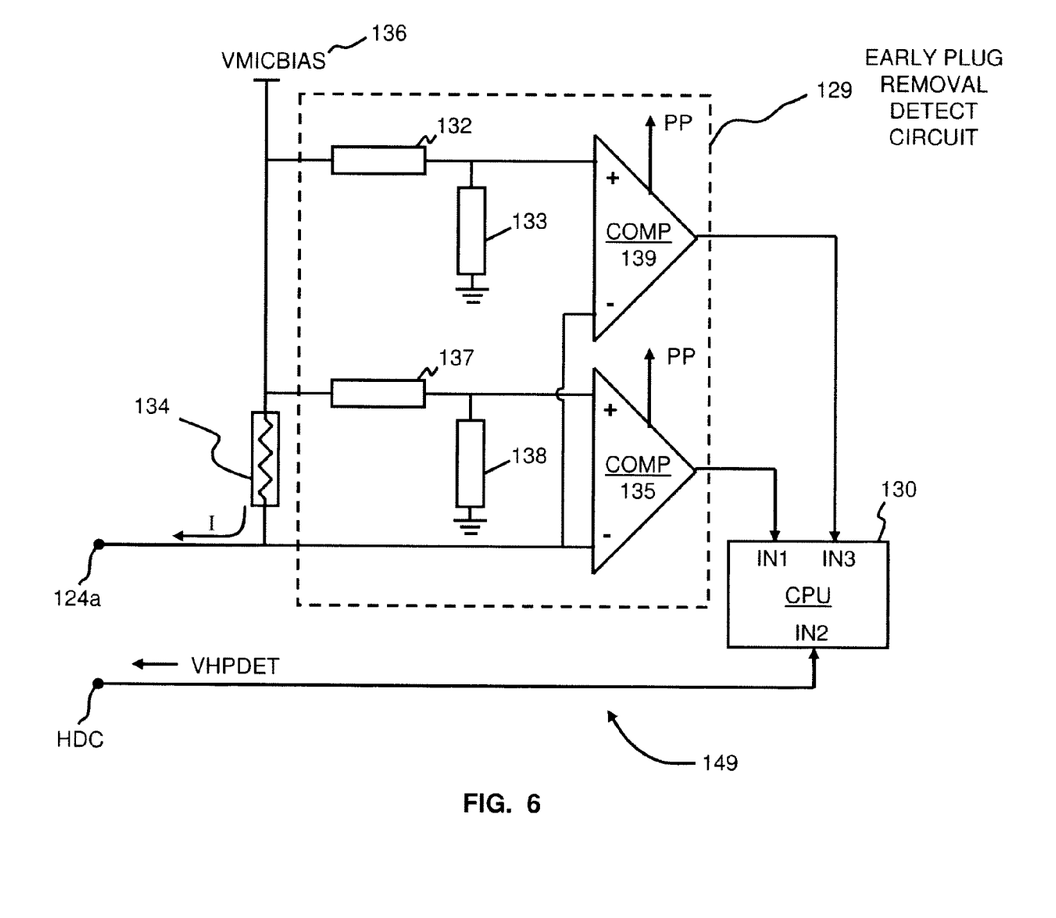
FIG. 6 shows an example of circuitry coupled to jack contacts for distinguishing between receiving a signal transition indicating actuation of a microphone button of the headset, and a transition indicating removal of the headset plug from the jack.

Jack 112 may also include a headphone detect mechanism (not shown, but such as circuitry 149 of FIG. 6 and voltage signal VHPDET of FIG. 5). In some embodiments, one of the functional contacts of jack 112 may be used to detect whether headset plug 114 is inserted into headset jack 112, using a switch that is actuated when the headset plug is inserted into the jack. For example, one of contact 124a, b, c or d can be coupled to an electrical switch that provides headphone detect signal VHPDET. VHPDET may be a voltage pulled-up to the voltage value of a bias or supply rail that gets short circuited through contact L (e.g., headphone left speaker contact) when the plug is inserted. Here, VHPDET will be approximately zero when not the plug is present P, and a bias voltage value when the plug is removed R.

FIG. 4 shows some embodiments of an example of a signal I output by microphone contact M electrically connected to microphone button 121 when the button is actuated. FIG. 4 shows signal output graph 462 plotting the current I versus time. Graph 462 may represent a case where a bias voltage Vmicbias is applied to contact M from contact 124a, and current level S1 is a normal output current response for the microphone. Thus, when sensing an audio signal, signal S1 represents a signal considered to be "normal" or in a normal range for the output of microphone 120. Alternatively, when button 121 is switched to a short circuit, by actuating button 121, short circuit signal S3 is created between contact M and ground, disconnecting the output of microphone 120 from contact M.

Thus, graph 462 shows normal current and voltage signal S1 at contact M when button 121 is in its normally open circuit position (e.g., not actuated) prior to time TS. Time TS represents when button 121 is transitioned to a short circuit position, such as by actuating button 121. Current I then transitions from S1 to S3. This transition may be detected at contact 124a and used by the phone to detect or identify actuation of button 121. As also shown, at a later time, button 121 may be released back to its normally open circuit position (e.g., not or non-actuated), transitioning signal I from S3 to S1.

If during removal of a microphone plug from a jack, a signal received by contact 124a is misinterpreted as signal I shown in FIG. 4, an erroneous detection of button actuation may occur. For example, in some embodiments, during plug removal, a microphone line of the jack (e.g., a signal line of phone 100 attached to contact 124a) may be connected to a substantially lower impedance path than a path on the microphone line, even though the microphone button is not actuated. The resulting signal levels, or a transition detected at contact 124a may be incorrectly interpreted as button actuation if removal of the plug is not yet detected. Thus, contact 124a is electrically connected to early plug removal detection circuit 129 in FIG. 3 to distinguish between signal I during plug removal from signal I during button actuation.

More specifically, FIGS. 5A-5C show examples of contact between jack contacts 124a-d and plug contacts M, G, R, and L during removal of the plug from the jack. These figures show example locations of the plug within the jack during a progression of removal between the plug being completely and properly inserted into jack 112 (e.g., FIG. 3), and the plug being completely removed from jack 112 (e.g., FIG. 2). Removal of the plug from the jack may include a portion, but not all of the plug being disposed within the jack, such as resulting from a device user pulls the plug out of the jack and/or when the plug is partially, but not completely removed from the jack.

FIGS. 5A-5C also show signal output graph 562 plotting current I and signal output graph 564 plotting voltage VHPDET versus time during removal of the plug from the jack. In FIG. 5, microphone line current I may be the signal received by a microphone line of phone 100 from contact M. When the microphone is sensing signals in the audio range, such as from a human voice, the output of the microphone may be considered to be in a "normal" range, such as shown by current signal S1. Also, when current I is zero (or the microphone line has no signal), the output of the microphone may be considered to be an open circuit voltage, such as shown signal S2. Next, when current I is substantially greater than S1 (or when the microphone line is connected to a substantially lower impedance path than a path when sensing signals in the audio range), the output of signal I may be signal S4 or S5. During removal, graph 562 of FIGS. 5A-5C shows periods corresponding to: (N) when contact 124a contacts contact M; (GR) contact 124a contacting contact G, and contact 124b contacting contact R; (RL) contact 124a contacting contact R and contact 124b contacting contact L; (CR) only contact L or no plug contact contacting contact 124a. FIG. 5 also shows upper current threshold TU between S1 and S4 or S5 (or S3); and lower current threshold TL between S1 and S2.

Signal VHPDET may be used by a detect mechanism of host 100 during a progression described for FIGS. 5A-5C to detect removal of plug 114 from jack 112. Transitions may be detected by comparing voltage VHPDET to voltage thresholds TR and TP. For instance, if VHPDET transitions to above TR, it may be detected that a transition to VR has occurred. Also, if VHPDET transitions to below TP, it may be detected that a transition to VP has occurred. Thus, times T1-T5; and time prior to time TR define headphone detect period P (presence of the plug). Conversely, time after time TR defines headphone detect period R (removal of the plug).

According to some embodiments, removal of the plug may not be detected using the signal transition of VHPDET at time TR until after a transition or level of current I is misinterpreted as button actuation. For instance, VHPDET may not transition at time TR until after the transition of signal I from S2 to S4 at time T3 (and optionally, not until after the transition S2 to S5 at time T5 as shown in FIG. 5), thus allowing the transition(s) of signal I to be misinterpreted as button actuation transition S1→S3 of FIG. 4. This may occur due to a required placement of conductors of the detect mechanism used to provide signal VHPDET, where the placement of conductors is selected or predetermined to maintain compatibility across various types of headphone plugs (e.g., plug 114) for various types of headphone or headset units. To avoid misinterpreting the signal I transition (s) during plug removal, a transition from signal S1 to S2; or from signal S2 to signal S4 or S5, may be detected.

For example, FIG. 5A shows contact between plug contacts and jack contacts when plug 114 is just beginning to be removed from or pulled out of jack 112. In this case, contact 124a is only electrically connected to or touching ring 123 of plug 114, and is not in contact with any adjacent contact of the plug (e.g., is not touching contacts M or G). Thus, current I may be S2 during the time period between T1 and T2. As shown in FIG. 5A, contact 124a may be biased towards insulator 123 between contact M and G of the plug, causing a transition in signal I from S1 to S2 before any of contact 124b-d are disconnected from contacts G, R and L of the plug.

However, in FIG. 5A a headphone detect mechanism may still be indicating the presence of the plug in the jack (e.g. based on signal VHPDET at detect contact HDC). Although current I transitions from S1 to S2 once contact 124a only contacts ring 123 of plug 114, the headphone detect signal VHPDET may not have transitioned yet from headphone to headphone removed signal VR at time TR.

FIG. 5B shows contact between plug contacts and jack contacts after the plug has been removed further from the jack than is shown in FIG. 5A and before FIG. 5C. FIG. 5B shows contact 124a of jack 112 electrically connected to or touching contact G of plug 114, and contact 124b of jack 112 electrically connected to or touching contact R of plug 114. As a result, speaker 118R is electrically connected between adjacent contacts G and R. According to embodiments, speaker 118R has a substantially lower impedance path than a path on the microphone headset line (e.g., through microphone 120 and button 121) when detecting an audio signal from the microphone during a phone call (e.g., and while button 121 is not activated). Thus, current I may be S4 (current level IGR), during the time period GR between T3 and T4.

In FIG. 5B a headphone detect mechanism may still be indicating the presence of the plug in the jack based on signal VHPDET still being equal present signal VP prior to time TR. Current I transitions from S2 to S4 once contact 124a contacts contact G of plug 114 and contact 124b contacts contact R. However, VHPDET has not yet transitioned to signal VR at time TR (e.g. may transition too late to avoid misinterpretation of signal S4 based only on VHPDET). Thus, the signal levels and/or transitions of FIG. 5A-B may be incorrectly interpreted as button actuation (signal S1 transition to S3 of FIG. 4) if plug removal is detected only using VHPDET. To avoid misinterpreting signal transitions S1→S2→S4 as transition S1→S3 of FIG. 4, transition to (or from) S2 prior to signal S4 (and after signal S1), may be detected.

After FIG. 5B and prior to FIG. 5C, contact 124a may transition from being electrically connected to or touching contact G of plug 114, to only being electrically connected to or touching ring 123 of plug 114 (e.g., not being in contact with either adjacent contact). Thus, current I transitions from S4 to S2 once contact 124a only contacts ring 123.

FIG. 5C shows contact between plug contacts and jack contacts after the plug has been removed further from the jack than is shown in FIG. 5B and before complete removal CR. FIG. 5C shows contact 124a of jack 112 electrically connected to or touching contact R of plug 114, and contact 124b of jack 112 electrically connected to or touching contact L of plug 114. As a result, speakers 118R and 118L are electrically connected in series between adjacent contacts R and L. According to embodiments, speakers 118R and 118L, in series, have a substantially lower impedance path than a path on the microphone headset line when detecting an audio signal from the microphone during a phone call. Thus, current I may be S5 (current level IRL), during the time period RL between T5 and T6. In some cases, speaker 118R and 118L may each have a resistance between 16 and 64 Ohms. Also, in some embodiments, microphone 120 has a resistance of between approximately 2K and 5.5K Ohms when biased with approximately 1 Volt and detecting an audio signal. For instance, the microphone can pull, depending on the type of microphone, typically between 180 µA and 500 µA at 1 Volt. It can be appreciated that these values may change depending on the operating point and/or type of the microphone.

In FIG. 5C a headphone detect mechanism may still be indicating the presence of the plug in the jack based on signal VHPDET which is still equal present signal VP as shown in segment P. Current I transitions from S2 to S5 once contact 124a contacts contact R of plug 114 and contact 124b contacts contact L. However, VHPDET has not yet transitioned to signal VR at time TR. Thus, the signal levels and/or transitions of FIG. 5B-C may be incorrectly interpreted as button actuation (signal S1 transition to S3 of FIG. 4) if plug removal is detected only using VHPDET. To avoid misinterpreting signal transitions S1→S2→S4→S2→S5 as transition S1→S3 of FIG. 4, transition to (or from) S2 prior to signal S5 (and after signal S1), may be detected.

After FIG. 5C, contact 124b may transition from being electrically connected to or touching contact L of plug 114, to being electrically connected to or touching none of the contacts of plug 114. For example, current I may transition from S5 to S2 at time T7. Once contact L is no longer in electrical contact with or touching contact 124b, current I may transition from signal S5 to signal S2 and remain at signal S2, such as until the plug is reinserted in the jack. This occurrence, at time T7 and indicate a period of "complete removal" of the plug from the jack as shown by period CR after time T7.

When the plug is not being removed, signal I in FIG. 4 does not include (or excludes) the transition from S1 to S2 as well as the transition from S2 to S4 that result from contact of contact 124a with ring 123 during removal of the plug as shown in FIG. 5. Consequently, detecting the signal transition from S1 to S2 at time T1, prior to the transition from signal S2 to S4 or S5 distinguishes current I during plug removal from current I during button actuation. Also, detecting the transition from S2 to S4 or S5 (at time T3 or T5) may be used to make such a distinction. Likewise, detecting transition to and from S2 prior S4 or S5 may be used to make such a distinction.

FIG. 6 shows an example of circuitry coupled to jack contacts for distinguishing between receiving a signal transition indicating actuation of a microphone button of a headset plugged into a device jack, and a transition indicating removal of the headset plug from the jack. FIG. 6 shows phone 100 including an example of early plug removal detection circuit 129 and additional plug detect circuitry 149 coupled to control unit 130. Control unit 130 may comprise specialized circuitry for detecting, interpreting, and changing behavior of phone 100 based signal I. In some embodiments, control unit 130 can comprise a CPU, other digital circuitry, analog circuitry, or any combination thereof of specialized circuitry for detecting, interpreting, and changing behavior of phone 100 based on the output of circuit 129 (and optionally circuit 149). In some embodiments, control unit 130 and/or phone 100 may include a CODEC, a processor, and/or a signal processor, such as to also process the audio output of (e.g., audio input to the device from) microphone 120.

Current I can be compared to the thresholds TU and TL using early plug removal detection circuit 129 of FIG. 6 to distinguished signal I during plug removal as compared to signal I during button actuation. Consequently, based on detecting one or both of the signal transitions from S1 to S2 and/or from S2 to S4, the host device (e.g., device 100) can ignore the total transition starting at S1 and resulting at S4 after FIG. 5A (eventually, after the transitions to and from S2 between T1 and T3). Thus, a telephone call may be maintained, instead of erroneously disconnected during removal of the plug from the jack. Such ignoring of the transition from S1 to S4 shown as shown in FIG. 5 may be described as "early" plug removal detection since it occurs prior to detection of headset removal by plug detect circuitry 149 of FIG. 6.

FIG. 6 illustrates additional plug detect circuitry 149 coupled to the headphone detect contact HDC receiving signal VHPDET for detecting the presence of a plug in accordance with some embodiments of the invention. Current VHPDET of FIG. 6 may be VHPDET of graph 564 shown in FIG. 5 used to indicate removal R of the plug, or indicating that the plug is present P. The detect contact HDC or signal VHPDET can be an input (such as at input IN2) to control unit 130, which can detect whether or not the detect contact voltage is high or low (e.g. see FIG. 5B), and instruct phone 100 to behave accordingly. When the signal on the detect contact is high, the control unit may instruct the phone to route input and output signals to built-in speaker 108 and microphone 110. Alternatively, when the signal is low, the control unit may instruct the phone to route input and output signals through contacts 124a-d to the headset. Circuitry of CPU 130 coupled to IN2 may receive signal VHPDET and determine whether VHPDET is (or transitions to) above or below thresholds TR and TP.

FIG. 6 also shows early plug removal detection circuit 129 coupled to contact 124a to detect transitions of current I on the microphone line. In accordance with embodiments of the invention such transitions include, but are not limited to transitions from a second signal (e.g. S2) indicating that the microphone is disconnected to a third signal (e.g. S4 or S5) indicating that a microphone button is actuated; and from a first stable DC level to a third stable DC level through a second stable DC level different from the first and third levels. Jack contact 124a can be an input (such as at input IN1) to control unit 130 and/or detect circuitry 129, which can (1) determine a signal (e.g., voltage and/or current) identifying a transition indicating removal of a headset plug from a jack, and (2) instruct phone 100 to behave accordingly (e.g. to ignore the signal incorrectly indicating that the microphone button is actuated).

For example, control unit 130 and/or circuit 129 could be used to detect whether or not signal I is at (or has transitioned to or from) signal level S1, S2, S3, S4 or S5 by comparing current I with the current thresholds (e.g., TL and/or TU of graphs 462 and 562). If the current I only transitions from below to above threshold TU, it may be detected that a transition from S1 to S3, S4 or S5 has occurred. Alternatively, if the current I only transitions from above to below threshold TL, it may be detected that a transition from S1 to S2 has occurred. Also, if the current I transitions from below TL to above TU, it may be detected that a transition from S2 to S4 or S5 has occurred. Next, if the current I transitions from above TU to below TL, it may be detected that a transition from S4 or S5 to S2 has occurred. Other transitions between signal level S1, S2, S3, S4 or S5 may be similarly detected.

FIG. 6 shows circuitry 132-139 interposed between control unit 130 and contact 124a. Circuitry 132-139 includes comparators 135 and 139; balance resistors or circuitry 132, 133, 137 and 138; and pull-up resistor 134 (e.g., one or more bias resistors). FIG. 6 also shows current I biased or partially controlled by Voltage Vmicbias 136 and resistor 134 to be output to contact 124a. Voltage Vmicbias may be voltage received at contact M of plug 114 and used to bias microphone 120. For example, when voltage Vmicbias is applied to contact 124a, signal I of graph 462 and/or 562 may result, as described herein.

Specifically, CPU 130 is coupled to circuitry 129 at IN1 and IN3 to determine whether signal I transitions from above to below, or transitions from below to above threshold TU and/or threshold TL. Threshold levels TU and TL can be set by selecting values for resistors 132, 133, 134, 137 and 138; and the voltage bias value for power 136. Thus TL can be set so that the output of comparator 135 switches from a high to a low signal when signal I transitions from S1 to S2 (or is below TL). TU can also be set, so that the output of comparator 139 switches from a low to a high signal when signal I transition from S2 to S3, S4 or S5 (or is above TU). CPU 130 may interpret transitions to or from level of S2 as indicating removal of the plug from the jack, distinguishing these transitions from the signal level transition from S1 to S3 without a transition through level S2, in which case there is no switch in the signal at IN1, which stays high. Maintaining this high signal excludes signal level transition from S1 to S2 and/or from S2 to S4 or S5 (prior to transition from S1 to S3), allowing detection of a transition from below to above TU at IN3 to indicate actuation of the microphone button, without plug removal.

In some cases, VHPDET level VR may be supplied by a bias voltage of approximately 3 volts, and a resistor or resistor network may have a value such that a bias current is provided during period present P of approximately 2 mA (milli-Amperes). Here, threshold TP and/or TR may be approximately 1 and 2 (or 1.5) volts. Also, according to embodiments, the power supplied at power 136 may be approximately 2 volts or 2.7 volts; and resistor 134 may be approximately 2.21 K Ohms. Here, threshold TL may be approximately 0.33, 0.5 or 0.66 mA; and threshold TU may be approximately 1.33, 1.5 or 1.66 mA. In some embodiments, signal I (e.g., Vmicbias minus Vdrop due to microphone, button, or speaker(s) of the headset) may be compared to a threshold TL and TU to provide the output of comparator 135 and 139 to inputs IN1 and IN3 respectively. For example, where power 136 is 2 or 2.7 volts, Vdrop to cause comparator 135 to switch from high to low may represent approximately 1.5 volts, and Vdrop to cause comparator 139 to switch from high to low may represent approximately 1.8 volts. These values may differ, based upon various microphone audio signal and button detection circuitry. In some cases the microphone bias voltage may be lower when modulated or non-stable DC frequencies are being used to indicate multiple button actuations of the headset to the telephony device.

According to embodiments, signal levels S1, S2, S3, S4, S5, VP, and VR may be described as stable direct current (DC) levels, such as the output signal of an input passed through a low pass filter, such as a filter that only passes signals below 10, 100, 200, 500 or 1,000 Hz. Similarly, a stable DC level may describe a signal output by comparators 135 and 139 (or circuitry 129) as shown in FIG. 6.

It can be appreciated that other designs for circuitry that provide the above noted detections and/or distinctions of transitions of signal I between signals S1-S5, can be used in place of circuitry 129. Similarly, other designs for circuitry that provide the above noted detections and/or distinctions of transitions of signal VHPDET between signals VR and VP, can be used in place of circuitry 149.

Figure 7:
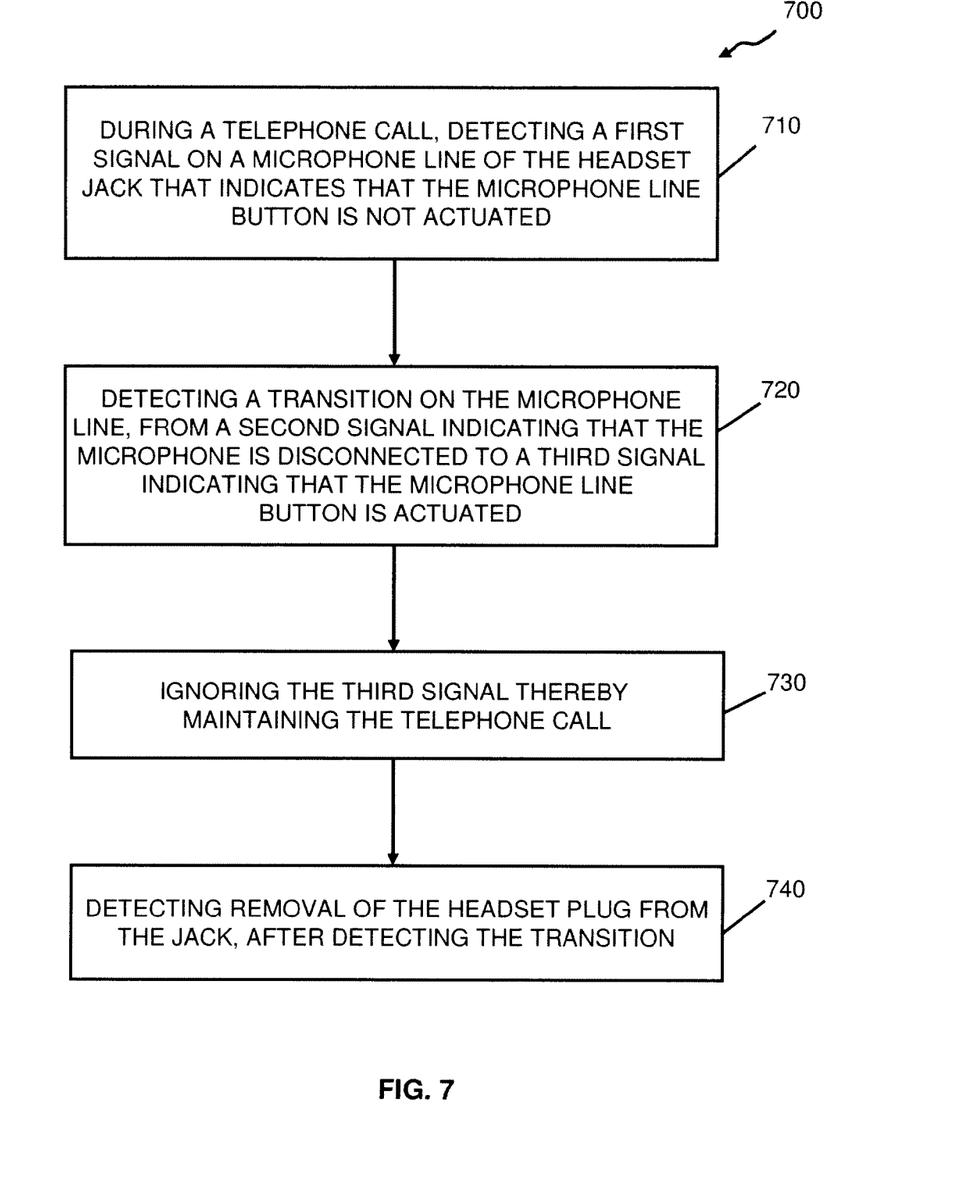
FIG. 7 shows some embodiments of an example of a flow diagram of a process for distinguishing between receiving a signal transition indicating actuation of a microphone button, and a transition indicating removal of the headset plug from the jack.

FIG. 7 shows some embodiments of an example of a flow diagram of a process for distinguishing between receiving a signal transition indicating actuation of a microphone button, and a transition indicating removal of the headset plug from the jack. FIG. 7 shows process 700 which may embody a process from embodiments described for FIGS. 1-6.

Process 700 starts with block 710 where, during a telephone call, a first signal on a microphone line of a headset jack is detected, the signal indicating that a microphone button is not actuated. Block 710 may correspond to detecting signal S1. After block 710 processing continues to block 720.

At block 720 a transition is detected on the microphone line, from a second signal indicating that the microphone is disconnected, to a third signal indicating that the microphone button is actuated. Block 720 may occur while the headset plug is being disconnected from the device jack. For example, block 720 may include detecting that signal I transitions from signal S2 to S4 or S5 (e.g., see time T3 or T5 of FIG. 5).

It is considered that block 720 may also include detecting transition from signal S1 to signal S2 (e.g., see time T1 of FIG. 5). Moreover, block 720 may include detecting both transitions from S2 to S4 and from S2 to S5. Also, block 720 may include detecting transitions from S4 to S2 and subsequently from S5 to S2 (e.g., see time T4 and/or T6 of FIG. 5). In some cases, block 720 may also include detecting the transitions above on the microphone line while continuing to detect signal VHPDET indicating the headphone is present P (e.g., not detecting the transition at time TR indicating that the headphone is removed R).

After block 720, process 700 continues to block 730 where the third signal is ignored, thereby maintaining the telephone call. Block 730 may include interpreting signal I as disconnection of the headset from the plug. Block 730 may describe not misinterpreting a button actuation; or distinguishing between signal I transmissions resulting from actuation of a microphone button and removal of the headset plug from the jack. Block 730 may include ignoring signal S4 or S5; or that signal I began at S1 and eventually transitioned to S4 or S5.

Block 740 describes detecting removal of the headset plug for the jack after detecting the transition of block 720. Block 740 may include detecting the transition if VHPDET at time TR, after detecting that signal I began at S1 and eventually transitioned to S4 or S5.

Figure 8:
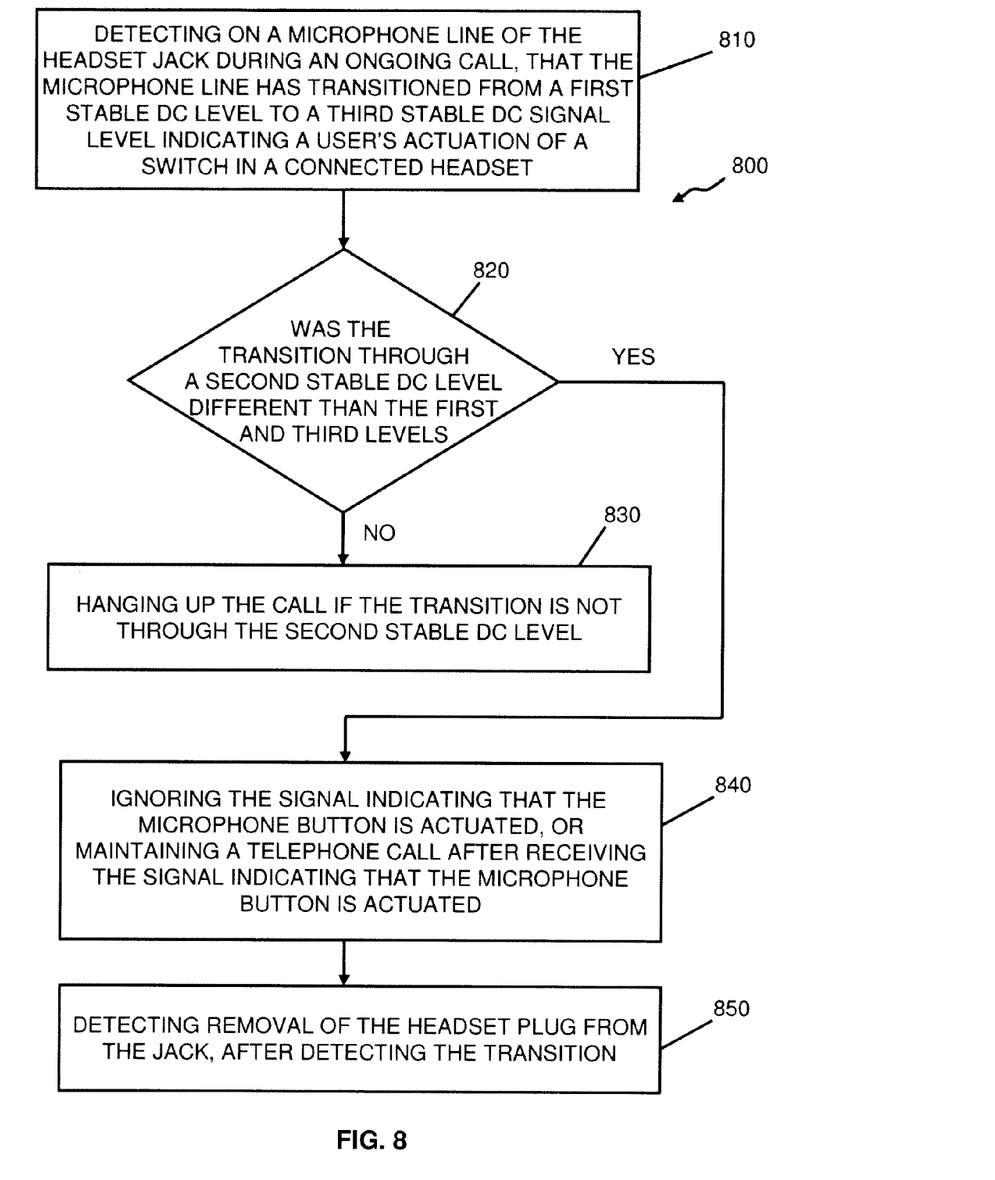
FIG. 8 shows some additional embodiments of an example of a flow diagram of a process for distinguishing between receiving a signal transition indicating actuation of a microphone button, and a transition indicating removal of the headset plug from the jack.

FIG. 8 shows additional embodiments of an example of a flow diagram of a process for distinguishing between receiving a signal transition indicating actuation of a microphone button, and a transition indicating removal of the headset plug from the jack. FIG. 8 shows process 800 which may embody a process from embodiments described for FIGS. 1-6.

Process 800 starts with block 810 by detecting on a microphone line of a headset jack during an ongoing call, that the microphone line has transitioned from a first stable DC level to a third stable DC signal level indicating a user's actuation of a switch in a connected headset. Block 810 may include detecting signal I transitioning from S1 to S3 as described for FIG. 4, such as by detecting that signal I has not transitioned across threshold TL.

After block 810, process 800 continues to block 820. At block 820 it is determined whether the transition occurred through a second stable DC level different than the first and third levels, such as a second level that is not between the first and third levels. Block 820 may include detecting whether signal I transitions across threshold TL.

Block 820 may include detecting that the transition through a second stable DC level includes one or more transitions between the second level and the third level, as described above for block 720. The second stable DC level may have an amplitude that is below an amplitude of current for the first signal and for the third signal.

If at block 820 the transition is not through a second stable DC level, process 800 continues to block 830 where an ongoing call is hung up or disconnected. Block 830 may include the device that performs blocks 810 and 820 causing the call to be hung up or disconnected by disconnecting the call at that device. Also, block 830 may include detecting the transition shown in FIG. 4 indicating that the microphone button has been actuated, thus determining that it is the users desire to disconnect the call.

If the transition is not through a second level at block 820 processing continues to block 840 to ignore the signal indicating that the microphone button is actuated; or to maintain a telephone call after receiving the signal indicating that the microphone button is actuated. Block 840 may include detecting that signal I has transitioned from S1 to S2; or from S2 to S4 or S5.

After block 840, process 800 continues to block 850 where removal of the headset plug from the jack is detected after detecting the transition of block 810. Block 850 may include descriptions above for block 740. Block 850 might also include detecting removal of the headset plug from the jack, after ignoring the third stable DC level as described for block 840. In some case, block 850 includes ignoring the third stable DC signal level, and maintaining a telephone call, after detecting the transition at block 810.

In some embodiments, in place of maintaining the telephone call in blocks 730 and/or 840, other actions or behaviors controlled by button 121 may be caused or ignored (e.g., not taken). For example, some phones will play music if a call is not in progress and the microphone button in actuated. In this case, ignoring the signal in those blocks may cause music to not start playing, although the music would have started playing if a single click of the headset button were detected. Since the signal is ignored, the music is not played.

In some embodiments, some or all of the blocks process 700 and/or 800 are caused by circuit 129, control unit 130, and/or circuitry 149. In addition, some or all of the blocks may describe controlling behavior of phone 100. Also, some or all of the blocks may be performed by a telephony device including call management circuitry (e.g., including circuit 129), such as to detect the transitions of signal I independently of a plug detect circuit (e.g., circuit 149) detecting removal of the plug from the jack. The telephony device may also include a balance circuit coupled to the call circuit to cause the call circuit to detect transitions between the second stable level and the third stable level, such as described above. Such balance circuitry may include resistors 137 and 138.

Next, headset 116 may be any component that can be coupled to and used in conjunction with phone 100, such as a headset including audio speakers, earphones, headphones, noise cancellation, a video display, microphone, or combinations of functionality thereof. The electronic coupling between signal contact 124a and contact M may be a wired or wireless electronic connection or attachment. For example, a wireless transmission system may exist between contact 124a and contact M, such as a transmission system transmitting audio signals, current, and voltage levels described herein.

Phone 100 may be specially constructed for the purposes described herein, or it may comprise or be part of a computer (e.g., portable, such as a laptop or hand held computer; or stationary, such as a desktop computer), portable device, telephone or cellular telephone specially configured by a computer program stored in a storage medium. Such a computer program (e.g., program instructions) may be stored in a machine (e.g. computer) readable non-volatile storage medium or memory, such as, a type of disk including floppy disks, optical disks, CD-ROMs, and magnetic-optical disks, read-only memories (ROMs), erasable programmable ROMs (EPROMs), electrically erasable programmable ROMs (EEPROMs), magnetic or optical cards, magnetic disk storage media, optical storage media, flash memory devices, or any type of media suitable for storing electronic instructions. Phone 100 may also include a processor coupled to the storage medium to execute the stored instructions. The processor may also be coupled to a volatile memory (e.g., RAM) into which the instructions are loaded from the storage memory (e.g., non-volatile memory) during execution by the processor. The processor and memory(s) may be coupled to circuitry 129, circuitry 149, and/or control unit 130. In some cases, the processor may include control unit 130.

At least certain embodiments of phone 100 may be part of a portable device, telephone or cellular telephone, which may include a media processing system to present the media, a storage device to store the media and may further include a radio frequency (RF) transceiver (e.g., an RF transceiver for a cellular telephone) coupled with an antenna system and the media processing system, computer, portable device, telephone or cellular telephone. In certain embodiments, media stored on a remote storage device may be transmitted to the media player through the RF transceiver. The media may be, for example, one or more of music or other audio, still pictures, or motion pictures. For example, these embodiments may be part of a mobile telephone which includes the functionality of one or more: media players (music and/or video media), entertainment systems, personal digital assistants (PDAs), general purpose computer systems, portable device, Internet capable portable device, special purpose computer systems, an embedded device within another device, or other types of data processing systems or devices (e.g., an iPhone® from Apple Inc. of Cupertino, Calif.).

The processes, instructions, and/or circuitry described herein may be designed and/or sold by handset manufacturers, such as manufacturers of a "source device" that can distinguish between microphone line (e.g., microphone contact) signal transitions resulting from (1) actuation of a microphone button of a headset plugged into a device jack, and (2) removal of the headset plug from the jack.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for operating a telephone device having a headset jack to connect with a headset plug of a headset, the headset having a microphone and a microphone button, the method comprising:

during removal of the headset plug from the headset jack, while a telephone call is active:

detecting a first signal;

after detecting the first signal, detecting from the headset jack a second signal that is different from the first signal;

determining whether the second signal equals or exceeds a first threshold or equals or is less than a second threshold; and maintaining the telephone call when the second signal is less than the first threshold.

2. The method as in claim 1, further comprising determining whether the second signal equals or exceeds the second threshold, wherein the first signal is less than the second threshold and greater than the first threshold.

3. The method as in claim 1, further comprising determining the headset plug has been disconnected from the headset jack when the second signal equals or is less than a second threshold.

4. The method as in claim 3, wherein:

the microphone is electrically connected to a signal line of the headset jack;

the first signal is detected on the signal line;

the second signal is detected on the signal line; and the method further comprises:

after detecting the second signal, detecting on the signal line a third signal that is greater than the first threshold; and after detecting the third signal, detecting the second signal on the signal line, wherein detecting the third signal and the second signal sequentially indicates the headset is removed completely from the headset jack.

5. The method as in claim 4, further comprising:

detecting a fourth signal on the signal line; and detecting a fifth signal on the signal line after detecting the third signal, wherein the fifth signal is different from the fourth signal and the detection of the fifth signal confirms the headset is removed completely from the headset jack.

6. The method as in claim 1, wherein determining whether the second signal equals or exceeds the first threshold includes determining whether or not the second signal occurs after a minimum time has elapsed since detecting the first signal.

7. The method as in claim 1, wherein:

the microphone is electrically connected to a signal line of the headset jack;

the first signal is detected on the signal line;

the second signal is detected on the signal line; and the signal line is electrically connected to an electrical contact within the headset jack.

8. The method as in claim 7, wherein:

the electrical contact is in contact with a first signal contact of the headset plug when the headset plug is substantially completely inserted into the headset jack; and the electrical contact is in contact with a second signal contact of the headset plug when the headset plug is at least partially removed from the headset jack.

9. The method as in claim 8, wherein:

the first signal contact of the headset plug is a microphone signal contact; and the second signal contact of the headset plug is a speaker contact.

10. The method as in claim 1, wherein a signal line is electrically connected to a headset circuit that includes the microphone and the microphone button.

11. The method as in claim 10, wherein:

the signal line is further electrically connected to a headset plug detection circuit; and the headset plug detection circuit determines whether an electrical characteristic of the headset circuit on the signal line corresponds to an actuated or an unactuated button.

12. A method for operating a telephony device having a headset jack to connect with a headset plug of a headset, the headset having a microphone and a microphone button, the method comprising:
during removal of the headset plug from the headset jack, while a telephone call is active:
detecting a first signal on a signal line;
after detecting the first signal, detecting a second signal on the signal line, wherein the second signal is less than the first signal;
after detecting the second signal, detecting a third signal on the signal line, wherein the third signal is greater than the first signal; and
maintaining the telephone call based on the detection of the second and third signals.

13. The method as in claim 12, further comprising detecting removal of the headset plug from the headset jack based on the detection of the second and third signals.

14. The method as in claim 13, further comprising causing audio files stored in the telephony device to not play.

15. A portable telephone device, comprising:
a microphone connected to a microphone button; and
a headset jack configured to receive a headset plug of a headset, wherein a signal line electrically connects the microphone to the headset jack, wherein during a telephone call, a headset plug detection circuit determines that the headset plug has been removed from the headset jack based on detection of a sequence of at least three different signals on the signal line during removal of the headset plug from the headset jack.

16. The portable telephone device as in claim 15, wherein the at least three signals comprise a first signal, a second signal, and a third signal, wherein the first signal is less than a first threshold and greater than a second threshold, the second signal is equal to or less than the second threshold, and the third signal is equal to or greater than the first threshold.

17. The portable telephone device as in claim 16, wherein the first signal is detected at a first time, the second signal at a second time later than the first time, and the third signal at a third time later than the second time.

18. The portable telephone device as in claim 16, wherein the second signal is a signal indicating an open circuit and wherein the third signal is a signal indicating a substantially lower impedance path than a path on the signal line when detecting the first signal.

19. A method for operating a telephone device having a headset jack to connect with a headset plug of a headset, the headset having a microphone and a microphone button, the method comprising:
during a telephone call and with the microphone electrically connected to a signal line of the headset jack, detecting a first signal on the signal line;
after detecting the first signal, detecting on the signal line a second signal that is different from the first signal;
determining whether the second signal equals or exceeds a first threshold, including determining whether the second signal occurs after a minimum time has elapsed since detecting the first signal;
determining whether the second signal equals or is less than a second threshold that is less than the first threshold, including determining whether the second signal occurs before the minimum time has elapsed since detecting the first signal;
in accordance with a determination that the second signal equals or is less than the second threshold and that the second signal occurs after the minimum time has elapsed, maintaining the telephone call; and
in accordance with a determination that the second signal equals or exceeds the first threshold and that the second signal occurs before the minimum time has elapsed since detecting the first signal, determining that the microphone button is actuated.

20. The method as in claim 19, wherein the first signal is less than the first threshold and greater than the second threshold.

21. The method as in claim 19, wherein determining that the second signal equals or is less than the second threshold indicates the headset is disconnected from the headset jack.

22. The method as in claim 19, further comprising:
after detecting the second signal, detecting on the signal line a third signal that equals or exceeds the first threshold; and
after detecting the third signal, detecting a fourth signal on the signal line, wherein the fourth signal is substantially the same as the second signal, wherein detecting the third signal and the fourth signal sequentially indicates the headset is disconnected from the headset jack.

23. The method as in claim 22, further comprising:
during the telephone call and with a headset plug detection circuit electrically connected to a headset plug detection line of the headset jack, detecting a fifth signal on the headset plug detection line; and
detecting a sixth signal on the headset plug detection line after detecting the third signal on the signal line, wherein the sixth signal is different from the fifth signal and the detection of the sixth signal confirms the headset is removed completely from the headset jack.

24. A method for operating a telephone device having a headset jack to connect with a headset plug of a headset, the headset having a microphone and a microphone button, the method comprising:
during a telephone call and with the microphone electrically connected to the headset jack, detecting a first signal;
after detecting the first signal, detecting from the headset jack a second signal that is different from the first signal;
determining whether the second signal equals or exceeds a first threshold or equals or is less than a second threshold, including determining whether or not the second signal occurs after a minimum time has elapsed since detecting the first signal; and
if the second signal is less than the first threshold, maintaining the telephone call.

25. The method of claim 24, further comprising determining whether the second signal equals or exceeds the second threshold, wherein the first signal is less than the second threshold and greater than the first threshold.

26. The method of claim 24, further comprising:
determining whether the second signal equals or exceeds the second threshold; and
in the event the second signal equals or exceeds the second threshold, determining that the microphone button is actuated.

27. The method of claim 26, further comprising, if the second signal equals or exceeds the second threshold, terminating the telephone call.

28. The method of claim 24, further comprising determining whether the second signal equals or exceeds the second threshold, wherein the first signal is less than the second threshold and greater than the first threshold.

29. The method of claim 24, further comprising detecting the headset plug being disconnected from the headset jack when the second signal equals or is less than the second threshold.

30. The method of claim 24, wherein the method occurs while the headset plug is being removed from the headset jack.

31. The method of claim 30, wherein:
   the first signal is detected on a signal line;
   the second signal is detected on the signal line; and
   the signal line is electrically connected to an electrical contact within the headset jack.

32. The method of claim 31, wherein:
   the electrical contact is in contact with a first signal contact of the headset plug prior to the headset plug being removed from the headset jack; and
   the electrical contact is in contact with a second signal contact of the headset plug when the headset plug is at least partially removed from the headset jack.

* * * * *